(12) United States Patent
Abe

(10) Patent No.: US 11,469,437 B2
(45) Date of Patent: Oct. 11, 2022

(54) ELECTRODE STACK MANUFACTURING APPARATUS

(71) Applicant: TOYOTA JIDOSHA KABUSHIKI KAISHA, Toyota (JP)

(72) Inventor: Nobuhira Abe, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 766 days.

(21) Appl. No.: 16/441,219

(22) Filed: Jun. 14, 2019

(65) Prior Publication Data
US 2020/0044273 A1    Feb. 6, 2020

(30) Foreign Application Priority Data

Aug. 6, 2018   (JP) .............................. JP2018-147809

(51) Int. Cl.
*H01M 10/04* (2006.01)
*H01M 10/0585* (2010.01)

(52) U.S. Cl.
CPC ... *H01M 10/0404* (2013.01); *H01M 10/0468* (2013.01); *H01M 10/0585* (2013.01)

(58) Field of Classification Search
CPC ..................... H01M 10/0404; H01M 10/0409
See application file for complete search history.

(56) References Cited

FOREIGN PATENT DOCUMENTS

| CN | 105914406 A | 8/2016 | |
|---|---|---|---|
| JP | 2010-212165 A | 9/2010 | |
| JP | 2016-157586 A | 9/2016 | |
| JP | 2017-062989 A | 3/2017 | |
| JP | 2017-065918 A | 4/2017 | |
| JP | 2017-130260 A | 7/2017 | |
| KR | 2018083484 A | * 7/2018 | ............ H01M 10/04 |

* cited by examiner

*Primary Examiner* — Maria Laios
*Assistant Examiner* — Bartholomew A Hornsby
(74) *Attorney, Agent, or Firm* — Sughrue Mion, PLLC

(57) ABSTRACT

An electrode stack manufacturing apparatus comprising a plate conveyance device (A) provided with a plurality of conveyor plates (20) made to move along a conveyance route while spaced apart from each other. The conveyor plates (20) are successively loaded with sheet-shaped electrodes (1). The conveyor plates (20) are provided with clamps (21, 22, 23, 24) clamping the sheet-shaped electrodes (1) carried on the conveyor plates (20) on the conveyor plates (20) and holding the sheet-shaped electrodes (1) at the placement positions on the conveyor plates (20) during conveyance.

10 Claims, 15 Drawing Sheets

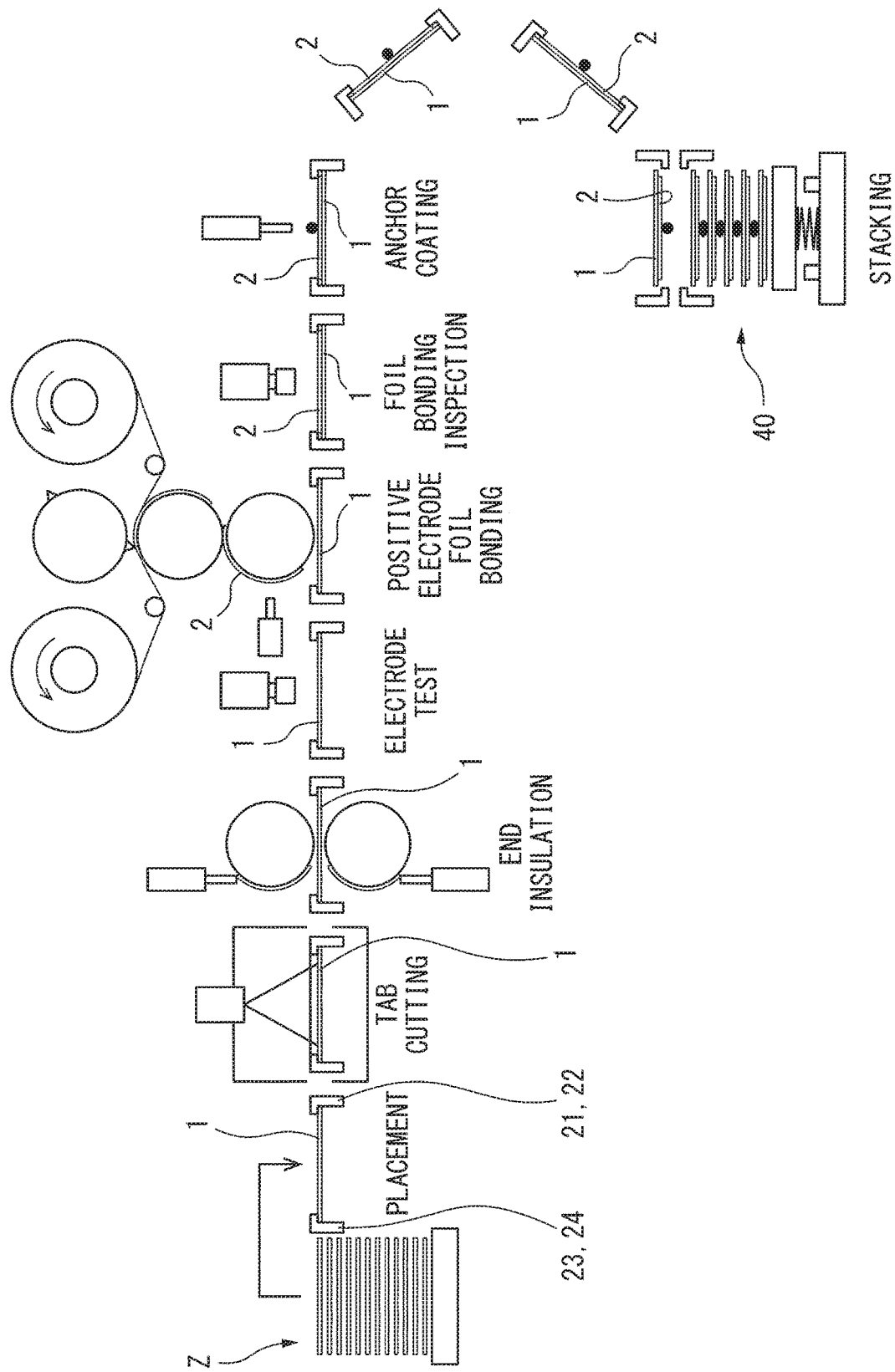

ELECTRODE STACK MANUFACTURING APPARATUS

FIELD

The present invention relates to an electrode stack manufacturing apparatus.

BACKGROUND

Known in the art is a battery module manufacturing apparatus designed to wrap a positive electrode, negative electrode, electrolyte, and other components of a battery by a laminate film to form a thin-walled box-shaped laminate battery, attach such a laminate battery to a jig for holding the ends of the peripheral edges of the laminate battery, stack such laminate batteries attached to jigs in states attached to the jigs, constrain the stacked laminate batteries in the stacking direction, after constraining them, detach all of the jigs from the laminate batteries, and thereby manufacture a battery module comprised of a stack of laminate batteries (for example, see Japanese Unexamined Patent Publication No. 2016-157586).

SUMMARY OF INVENTION

However, in this battery module manufacturing apparatus, there is the problem that each laminate battery has to be attached once to a jig and then all of the jigs have to be detached from the laminate batteries.

On the other hand, such a jig can be used even if stacking sheet-shaped electrodes not wrapped in laminate film.

However, when stacking sheet-shaped electrodes not wrapped in laminate film, if using such a jig, there is the problem that the outer peripheral edges of the sheet-shaped electrodes will contact the gripping parts of the jig and the outer peripheral edges of the sheet-shaped electrodes will be damaged.

To solve this problem, according to the present invention, there is provided an electrode stack manufacturing apparatus for manufacturing an electrode stack containing a sheet-shaped electrode, comprising:

a plate conveyance device provided with a plurality of conveyor plates which are made to move along a conveyance route spaced apart from each other, sheet-shaped electrodes being successively placed on the conveyor plates, each conveyor plate being provided with clamps for clamping the sheet-shaped electrode carried on the conveyor plate against the conveyor plate to thereby hold the sheet-shaped electrode at a placement position on the conveyor plate during conveyance.

Since each sheet-shaped electrode is clamped against a conveyor plate by clamps, no external force is applied to the outer peripheral edges of the sheet-shaped electrode and therefore it is possible to prevent the outer peripheral edges of the sheet-shaped electrode from being damaged.

BRIEF DESCRIPTION OF DRAWINGS

FIG. 7 is a view showing a stacking process of sheet-shaped electrodes.

DESCRIPTION OF EMBODIMENTS

Figure 2A:
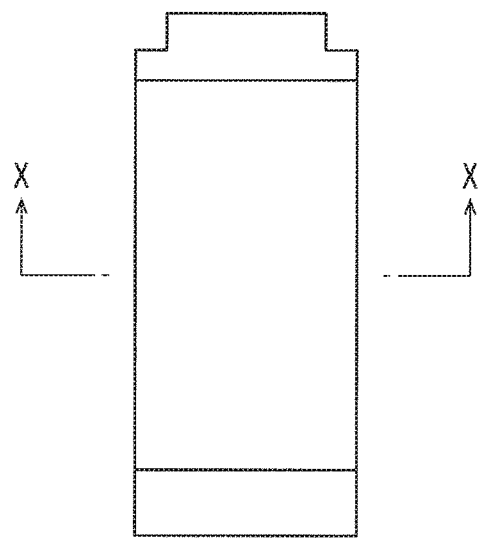
FIGS. 2A, 2B, 2C, and 2D are views for explaining a unit battery and a sheet-shaped electrode.
Figure 2B:
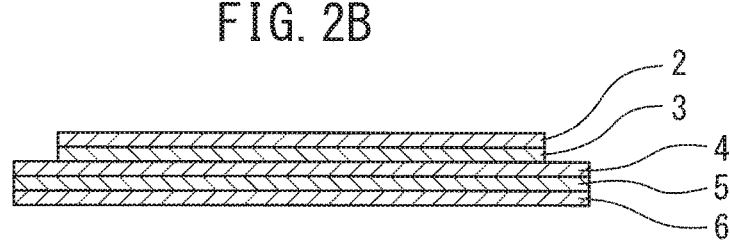

The present invention relates to an apparatus for manufacturing an electrode stack. In an embodiment according to the present invention, this electrode stack is formed by stacking sheet-shaped electrodes. By electrically connecting a formed plurality of such electrode stacks in series or in parallel, for example, a battery for mounting in a vehicle is formed. Therefore, first, to start, the sheet-shaped electrode used for forming this electrode stack will be explained. FIG. 2A and FIG. 2B respectively show a plan view of a component of a battery manufactured using this sheet-shaped electrode, that is, a unit battery, and a cross-sectional view of a unit battery seen along the X-X line of FIG. 2A. Note that, the thickness of the unit battery is 1 mm or less. Therefore, in FIG. 2B, the thickness of each layer is shown considerably exaggerated.

Referring to FIG. 2B, 2 indicates a positive electrode current collector layer, 3 indicates a positive electrode active material layer, 4 indicates a solid electrolyte layer, 5 indicates a negative electrode active material layer, and 6 indicates a negative electrode current collector layer. The positive electrode current collector layer 2 is formed from a conductive material. In the embodiment according to the present invention, this positive electrode current collector layer 2 is formed from metal foil for current collection use, for example, aluminum foil. Further, the positive electrode active material layer 3 is formed from a positive electrode active material able to store lithium ions, sodium ions, calcium ions, and other metal ions at the time of discharge and to release them at the time of charging. Further, the solid electrolyte layer 4 is formed from a material having conductivity with respect to lithium ions, sodium ions, calcium ions, and other metal ions and able to be utilized as a material for an all solid state battery.

On the other hand, the negative electrode active material layer 5 is formed from a negative electrode active material able to release lithium ions, sodium ions, calcium ions, and other metal ions at the time of discharge and to store them at the time of charging. Further, the negative electrode current collector layer 6 is formed from a conductive material. In the embodiment according to the present invention, this negative electrode current collector layer 2 is formed from metal foil for current collection use, for example, copper foil. Further, as will be understood from the abovementioned explanation, the batteries manufactured in the embodiment of the present invention are all solid state batteries, and in this case, the batteries are preferably all solid lithium ion secondary batteries.

Figure 2C:
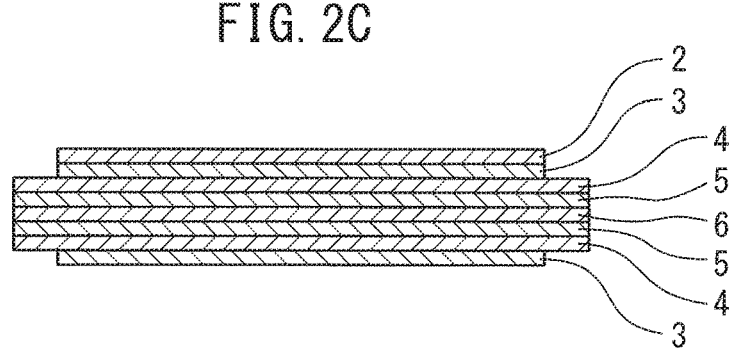
Figure 2D:
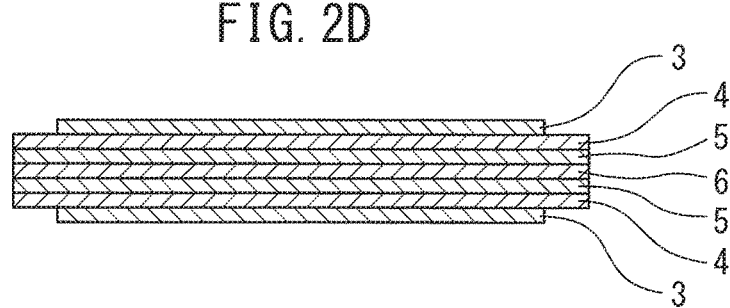

Now then, a sheet-shaped electrode used in the embodiment according to the present invention has a rectangular plan shape similar to FIG. 2A and has a cross-sectional structure shown in FIG. 2C or FIG. 2D. Note that, these FIG. 2C and FIG. 2D show cross-sectional views at positions similar to the X-X line of FIG. 2A. Note that, in these FIG. 2C and FIG. 2D as well, in the same way as FIG. 2B, 2 indicates a positive electrode current collector layer, 3 indicates a positive electrode active material layer, 4 indicates a solid electrolyte layer, 5 indicates a negative electrode active material layer, and 6 indicates a negative electrode current collector layer. The sheet-shaped electrode shown in FIG. 2C has a negative electrode current collector layer 6 positioned at its center part. In the upward direction from this negative electrode current collector layer 6, a negative electrode active material layer 5, solid electrolyte layer 4, positive electrode active material layer 3, and positive electrode current collector layer 2 are successively formed. In the downward direction from the negative electrode current collector layer 6, a negative electrode active material layer 5, solid electrolyte layer 4, and positive electrode active material layer 3 are successively formed. In this case, in the embodiment according to the present invention, the negative electrode current collector layers 6 are formed from copper foil, while the positive electrode current collector layers 2 are formed from aluminum foil.

On the other hand, the sheet-shaped electrode shown in FIG. 2D has a negative electrode current collector layer 6 positioned at its center part. In each of the upward direction and downward direction from this negative electrode current collector layer 6, a negative electrode active material layer 5, solid electrolyte layer 4, and positive electrode active material layer 3 are successively formed. That is, the sheet-shaped electrode shown in FIG. 2D does not have the positive electrode current collector layer 2. In the case shown in FIG. 2D as well, the negative electrode current collector layer 6 is formed from copper foil. In the embodiment according to the present invention, the sheet-shaped electrode of the cross-sectional shape shown in FIG. 2D is formed in advance. As explained later, in the middle of the stacking process, aluminum foil (positive electrode current collector) is bonded to the sheet-shaped electrode of the cross-sectional shape shown in FIG. 2D. As a result, the sheet-shaped electrode of the cross-sectional shape shown in FIG. 2C, that is, the sheet-shaped electrode with aluminum foil 2 bonded to it, is formed.

In the embodiment according to the present invention, the sheet-shaped electrode to which this aluminum foil 2 is bonded is called the "sheet-shaped electrode 1". Note that, in the explanation of the embodiments according to the present invention, if not considered particularly confusing, the sheet-shaped electrode of the cross-sectional shape shown in FIG. 2D to which no aluminum foil 2 is bonded will also be called a "sheet-shaped electrode 1". As opposed to this, if it is desirable to express differentiated the sheet-shaped electrode 1 to which aluminum foil 2 is bonded and the sheet-shaped electrode 1 to which aluminum foil 2 is not bonded, the sheet-shaped electrode to which aluminum foil 2 is bonded will be called a "sheet-shaped electrode 1 with a positive electrode", while the sheet-shaped electrode to which aluminum foil 2 is not bonded will be referred to as a "sheet-shaped electrode 1 without a positive electrode".

Note that, the sheet-shaped electrodes 1 shown in FIG. 2C and FIG. 2D show single illustrations. Use of various structures of sheet-shaped electrodes 1 may be considered. For example, on one surface of the copper foil 6, it is possible to form a negative electrode active material layer 5, solid electrolyte layer 4, positive electrode active material layer 3, and positive electrode current collector layer 2, to form a negative electrode active material layer 5, solid electrolyte layer 4, and positive electrode active material layer 3, to form a negative electrode active material layer 5 and solid electrolyte layer 4, or to form only a negative electrode active material layer 5, while on the other surface of the copper foil 6, it is possible to form a negative electrode active material layer 5 and solid electrolyte layer 4 or form only a negative electrode active material layer 5 or to not form anything. Further, instead of the copper foil 6, it is possible to use the aluminum foil for forming the positive electrode current collector layer 2 and form on one surface of this aluminum foil 2 a positive electrode active material layer 3, solid electrolyte layer 4, negative electrode active material layer 5, and negative electrode current collector layer 6, to form a positive electrode active material layer 3, solid electrolyte layer 4, and negative electrode active material layer 5, to form a positive electrode active material layer 3 and solid electrolyte layer 4, or to form only a positive electrode active material layer 3 and possible to form on the other surface a positive electrode active material layer 3, solid electrolyte layer 4, and negative electrode active material layer 5, to form a positive electrode active material layer 3 and solid electrolyte layer 4, to form only a positive electrode active material layer 3, or to not form anything at all in the structure.

Therefore, if expressing this comprehensively, in the present invention, the sheet-shaped electrode 1 includes metal foil 2 or 6 for current collection use and at least one of a positive electrode active material layer 3 and negative electrode active material layer 5 formed on the metal foil 2 or 6 for current collection use. Note that, below, embodiments of the present invention will be explained taking as an example the case of the sheet-shaped electrode 1 having a structure shown in any of FIG. 2C and FIG. 2D.

Figure 1:
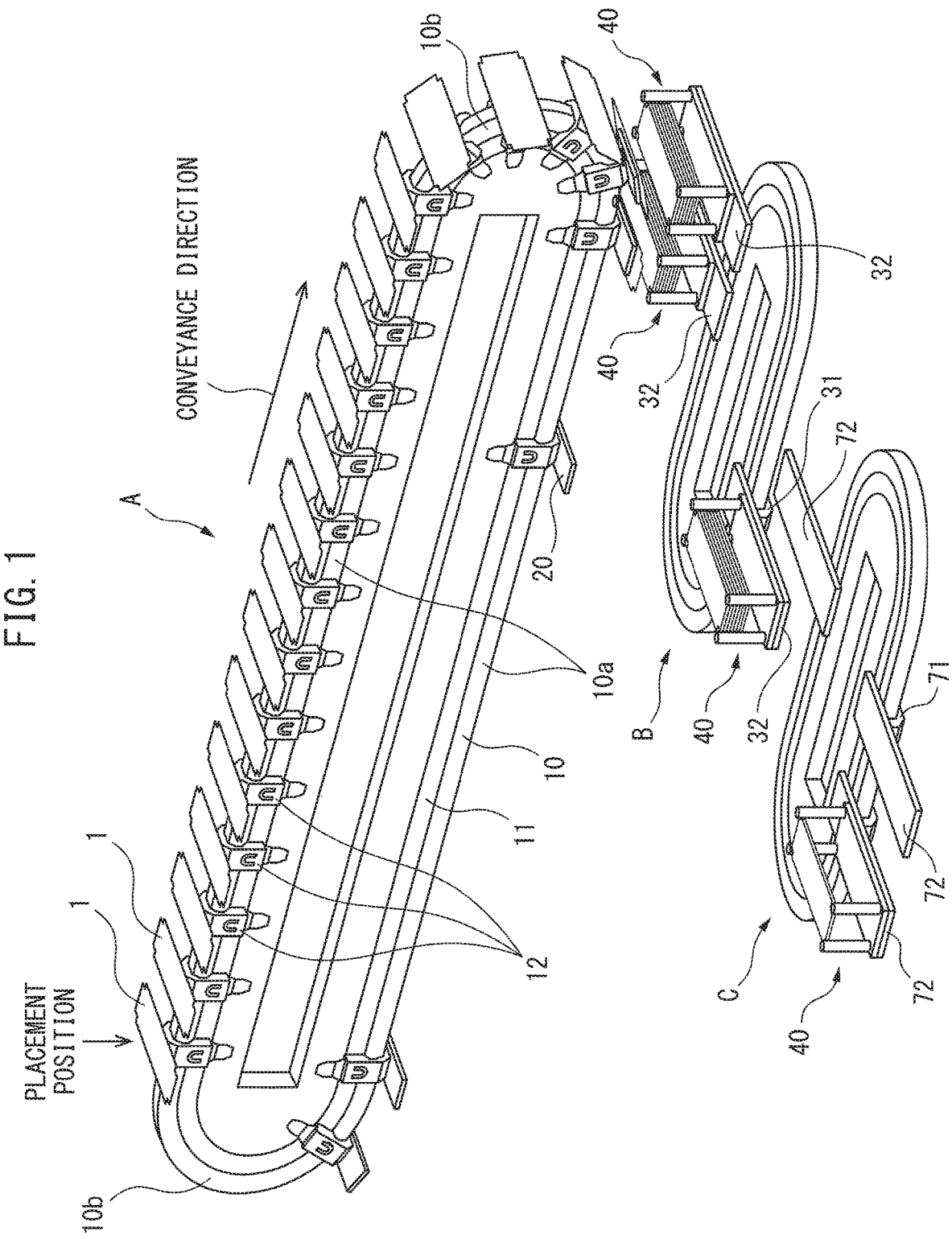
FIG. 1 is an overall view of a plate conveyance device, jig conveyance device, and jig transfer device.

Referring to FIG. 1, FIG. 1 shows a plate conveyance device A, jig conveyance device B, and jig transfer device C. The plate conveyance device A is supplied with a sheet-shaped electrode 1 without a positive electrode with a cross-sectional shape shown in FIG. 2D at a placement position shown by the arrow in FIG. 1. This sheet-shaped electrode 1 is conveyed by the plate conveyance device A in the direction of conveyance shown by the arrow for forming an electrode stack including the sheet-shaped electrode 1.

Figure 3:
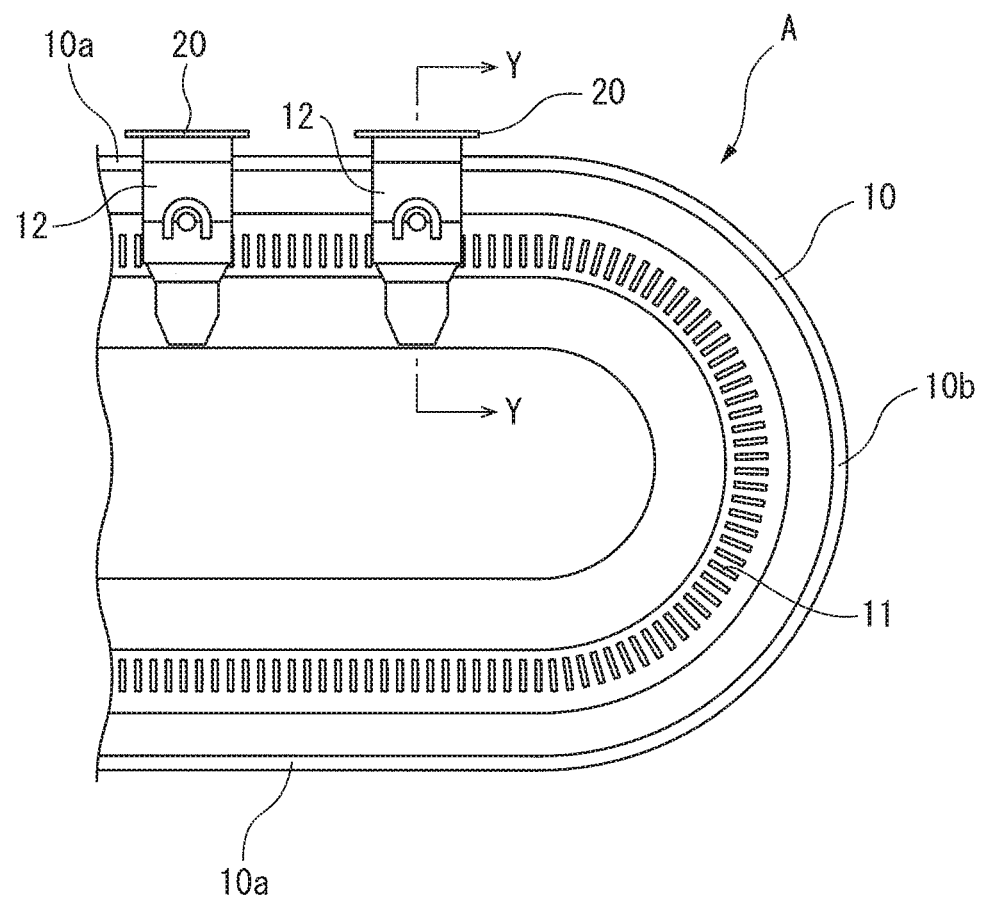
FIG. 3 is an enlarged side view of part of the plate conveyance device shown in FIG. 1.
Figure 4:
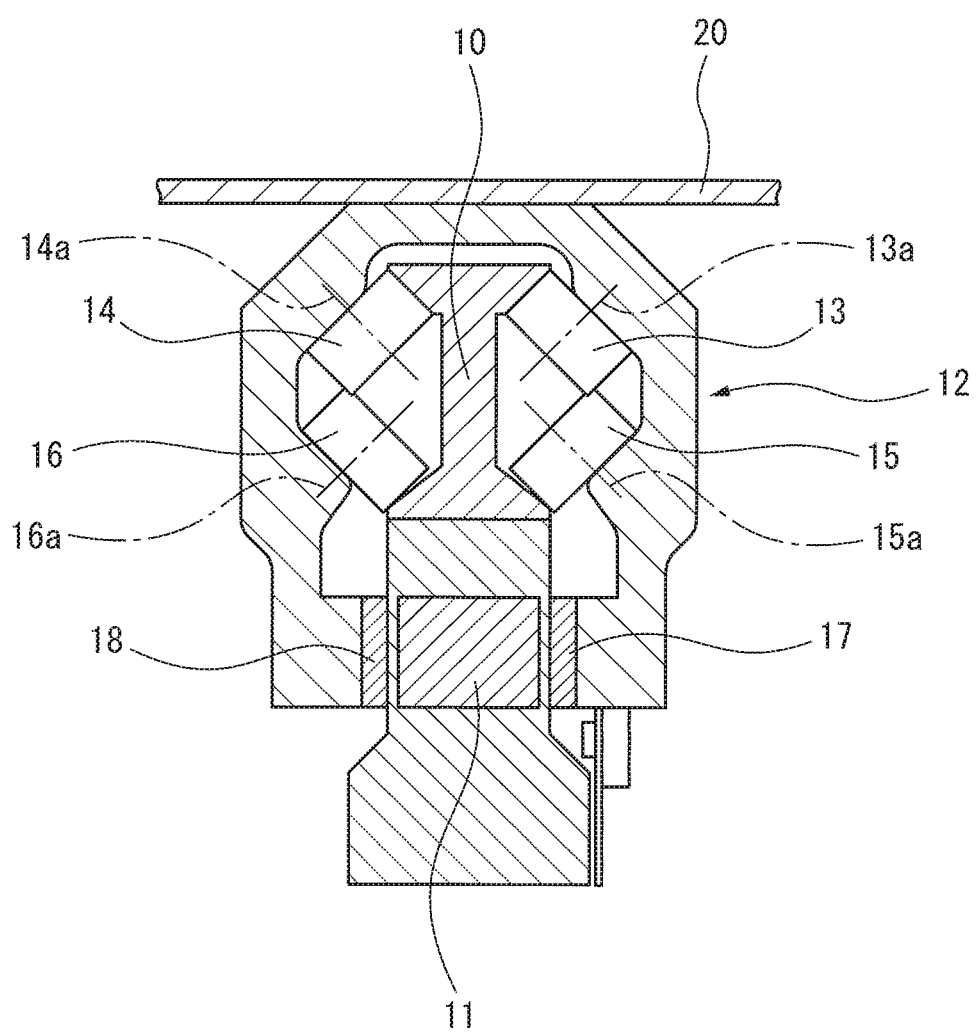
FIG. 4 is a cross-sectional view of a mover.

Next, this plate conveyance device A will be explained. FIG. 3 shows an enlarged side view of part of the plate conveyance device A shown in FIG. 1. Referring to FIG. 1 and FIG. 3, the plate conveyance device A is provided with an elliptical shaped rail 10 comprised of horizontal straight parts 10a spaced apart from each other in the vertical direction in the vertical plane and a pair of semicircular parts 10b and a plurality of movers 12 able to run on this rail 10. FIG. 4 shows a cross-sectional view of the mover 12 seen along the Y-Y line of FIG. 3. As shown in FIG. 4, this mover 12 is provided with a pair of guide rollers 13 attached to the mover 12 to be able to rotate about an axis 13a and roll on the rail 10 (arranged at the front and rear in the direction of advance), a pair of guide rollers 14 attached to the mover 12 to be able to rotate about an axis 14a and roll on the rail 10 (arranged at the front and rear in the direction of advance), a guide roller 15 attached to the mover 12 to be able to rotate about an axis 15a and roll on the rail 10, and a guide roller 16 attached to the mover 12 to be able to rotate about an axis 16a and roll on the rail 10.

On the other hand, this mover 12 is provided with a pair of permanent magnets 17, 18. Inside of the plate conveyance device A sandwiched between these permanent magnets 17, 18, a stator 11 around which a coil is wound is arranged. This stator 11 and permanent magnets 17, 18, that is, the stator 11 and mover 12, form a linear motor. Therefore, in the plate conveyance device A, the mover 12 of the linear motor is made to run on the rail 10. The speed of movement of this mover 12 etc. are controlled by a control device (not shown) of the plate conveyance device A.

Figure 5:
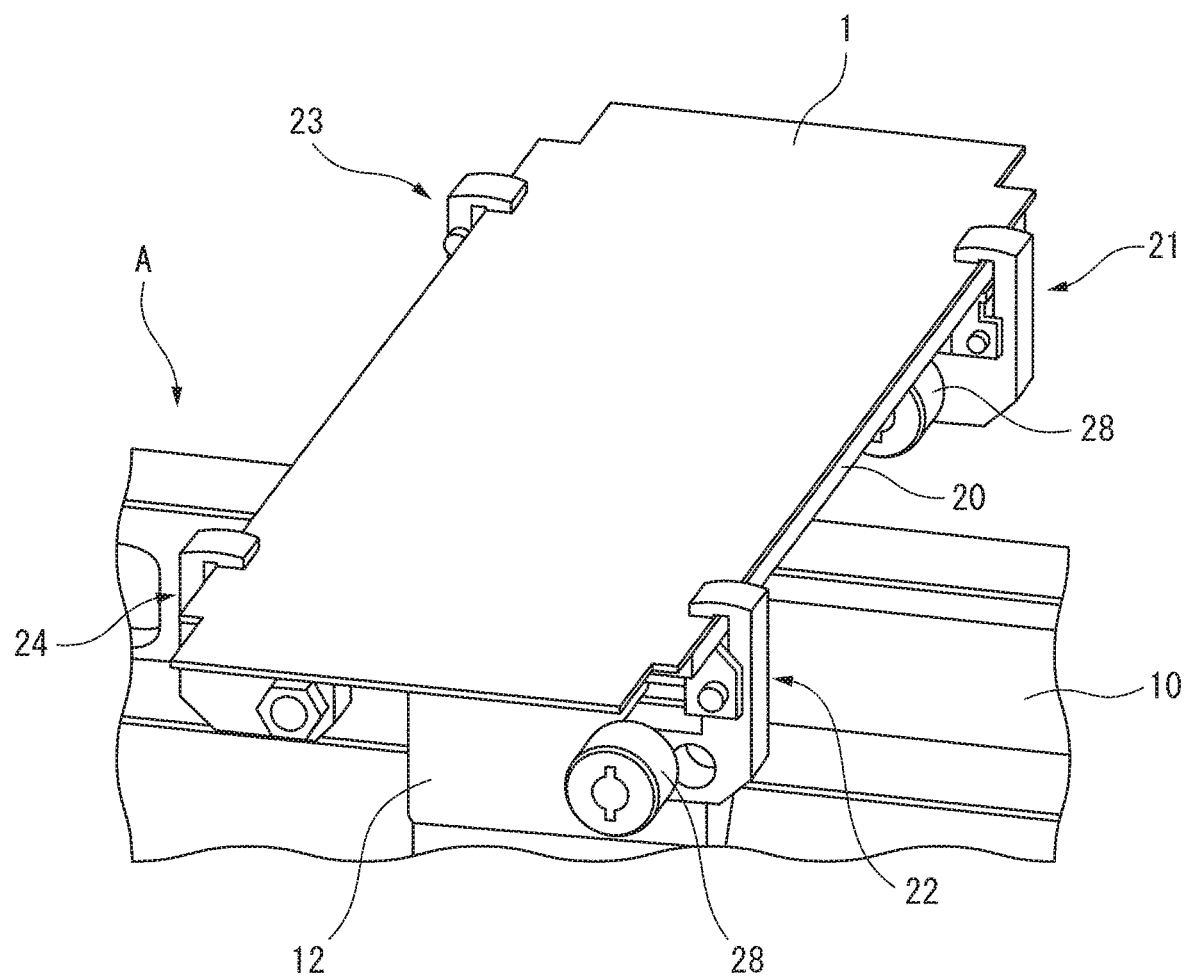
FIG. 5 is a perspective view of a conveyor plate.

As shown in FIG. 3 and FIG. 4, on the mover 12, a rectangular shaped conveyor plate 20 is attached. On this conveyor plate 20, a sheet-shaped electrode 1 is placed. FIG. 5 shows a perspective view of the conveyor plate 20 attached to the mover 12. Referring to FIG. 5, in the embodiment according to the present invention, the conveyor plate 20 has a plurality of clamps 21, 22, 23, 24 attached for clamping the sheet-shaped electrode 1 carried on the conveyor plate 20 against the conveyor plate 20 and holding the sheet-shaped electrode 1 at the placement position on the conveyor plate 20 during conveyance. In the embodiment shown in FIG. 5, a pair of clamps 21, 22 are attached spaced apart from each other at the front end part of the conveyor plate 20 positioned at the front in the direction of advance while a pair of clamps 23, 24 are attached spaced apart from each other at the rear end part of the conveyor plate 20 positioned at the rear in the direction of advance.

Figure 6A:
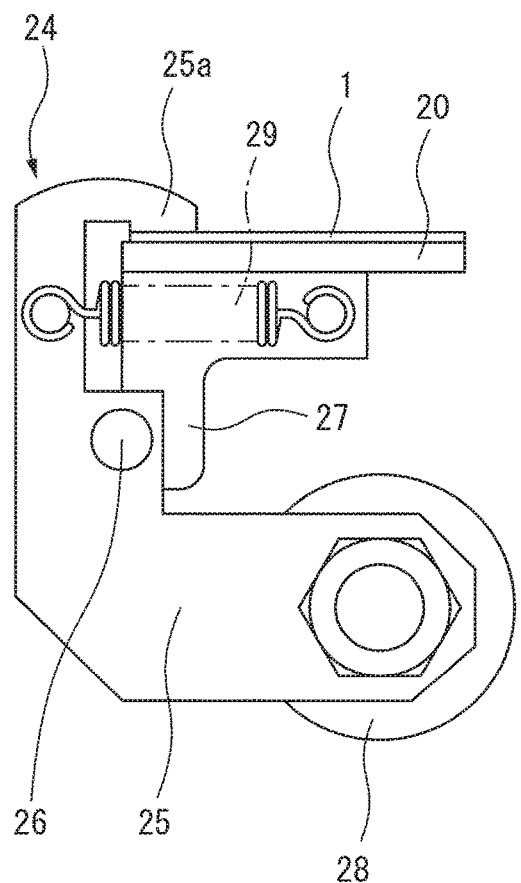
FIGS. 6A and 6B are views for explaining the operation of a clamp of a conveyor plate.
Figure 6B:
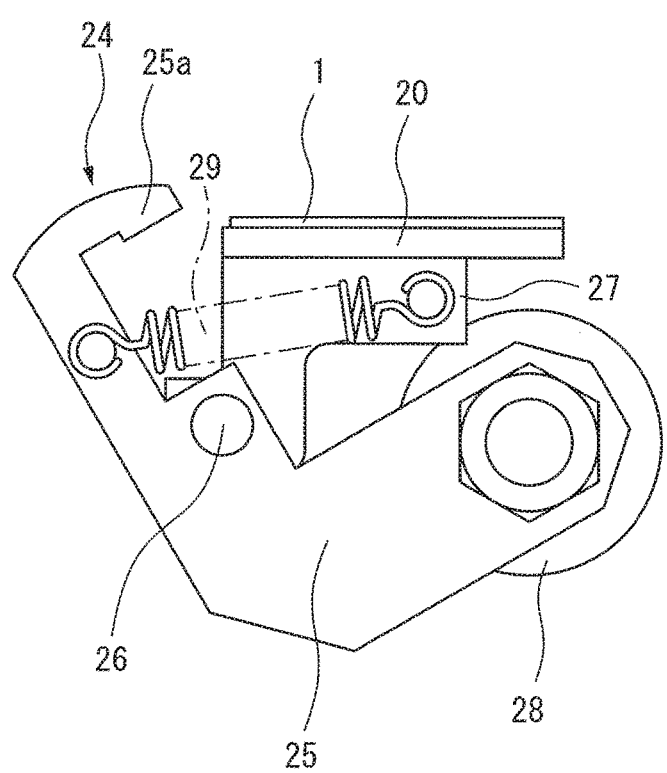

These clamps 21, 22, 23, 24 have the same structure. Therefore, the clamp 24 will be used as an example to explain the structure of the clamps. FIG. 6A shows the time when the sheet-shaped electrode 1 is clamped against the conveyor plate 20 by the clamp 24, while FIG. 6B shows the time when the clamp 24 releases the sheet-shaped electrode 1. Referring to FIG. 6A and FIG. 6B, the clamp 24 is provided with a clamp arm 25 forming a roughly speaking L-shape. The center part of this clamp arm 25 is attached by a support pin 26 to a support plate 27 fastened to the conveyor plate 20 to be able to rotate. One end of the clamp arm 25 is formed with a clamping part 25a extending to over the surface of the conveyor plate 20, while the other end of the clamp arm 25 has a roller 28 attached to it. The clamp arm 25 is constantly biased clockwise by a tension spring 29 attached between the clamp arm 25 and the support plate 27.

On the running route of the mover 12, a stationary cam (not shown) able to engage with the roller 28 of the clamp arm 25 is provided. The roller 28 of the clamp arm 25 normally does not engage with this stationary cam. At this time, as shown in FIG. 6A, the sheet-shaped electrode 1 is clamped against the conveyor plate 20 by the clamping part 25a of the clamp arm 25 due to the spring force of the tension spring 29. At this time, as will be understood from FIG. 6A, there is a gap between the clamp arm 25 and the outer peripheral edge of the sheet-shaped electrode 1. Therefore, the outer peripheral edge of the sheet-shaped electrode 1 does not contact the clamp arm 25. That is, at this time, the outer peripheral edge of the sheet-shaped electrode 1 is in a noncontact state at the entire outer peripheral edge. Therefore, when the sheet-shaped electrode 1 is clamped against the conveyor plate 20 by the clamping part 25a of the clamp arm 25, the outer peripheral edge of the sheet-shaped electrode 1 will not be damaged. On the other hand, if the roller 28 of the clamp arm 25 engages with the stationary cam, as shown in FIG. 6B, the roller 28 will rise and the sheet-shaped electrode 1 will be released from the clamping part 25a of the clamp arm 25.

Next, referring to FIG. 7, the process of stacking the sheet-shaped electrodes will be explained. FIG. 7 schematically shows this process of stacking the sheet-shaped electrodes. This FIG. 7 schematically shows the sheet-shaped electrodes 1 carried on the conveyor plates 20 and clamps 21, 22, 23, 24 attached to the conveyor plates 20. However, in FIG. 7, the conveyor plates 20 are omitted. Note that, this FIG. 7 shows various processing when the sheet-shaped electrodes 1 are conveyed by the plate conveyance device A.

In the embodiment according to the present invention, the two surfaces of a long narrow copper foil are successively coated at intervals in the longitudinal direction of the copper foil with negative electrode active material layers, solid electrolyte layers, and positive electrode active material layers so as to be superposed on each other. Next, this copper foil is cut into predetermined lengths to thereby prepare sheet-shaped electrodes 1 without positive electrodes with the cross-sectional shapes shown in FIG. 2D. These sheet-shaped electrodes 1 without positive electrodes are stacked on a storage table for storage. Z in FIG. 7 shows the sheet-shaped electrodes 1 without positive electrodes stacked on the holding table. The sheet-shaped electrodes 1 stacked on the holding table are successively placed, one at a time, by a not shown transfer device onto conveyor plates 20 at the upper horizontal straight rail part 10a of the plate conveyance device A as shown by the arrow in FIG. 7 at the placement position shown by the arrow of FIG. 1.

While the sheet-shaped electrode 1 carried on the conveyor plate 20 at the upper horizontal straight rail part 10a is moving along the horizontal straight part 10a of the plate conveyance device A, first, a tab cutting processing wherein an end part of the copper foil 6 is cut to form a connection use electrode tab is performed. Next, an end insulation processing for coating a part of the copper foil 6 with an insulating material to prevent a short-circuit with the aluminum (positive electrode) foil is performed. Next, a positive electrode foil bonding processing for bonding aluminum (positive electrode) foil 2 the sheet-shaped electrode 1 by an adhesive is performed. If this positive electrode foil bonding processing is performed, the sheet-shaped electrode 1 becomes a sheet-shaped electrode with a positive electrode with a cross-sectional shape shown in FIG. 2C. Next, a foil bonding inspection for inspecting whether or not the aluminum (positive electrode) foil 2 is suitably bonded to the sheet-shaped electrode 1 is performed. Next, an anchor coating processing for coating the aluminum (positive electrode) foil 2 with an adhesive to prevent the stacked sheet-shaped electrodes 1 from shifting from each other when a sheet-shaped electrode 1 with a positive electrode is stacked is performed.

Next, when the conveyor plate 20 reaches the semicircular rail part 10b of the plate conveyance device A and starts to advance along the semicircular rail part 10b, as shown in FIG. 7, the conveyor plate 20 starts to be turned upside down. When the conveyor plate 20 reaches the bottom end of the semicircular rail part 10b of the plate conveyance device A, the conveyor plate 20 is completely turned upside down. In the embodiment according to the present invention, the action of stacking the sheet-shaped electrode 1 with a positive electrode is performed in the state where the conveyor plate 20 is turned upside down in this way. This stacking action will be explained in detail later. Note that, if this stacking action is performed, the sheet-shaped electrode 1 with a positive electrode is removed from the conveyor plate 20 and the conveyor plate 20 becomes empty. Such empty conveyor plates 20 are successively made to move to the placement position shown in FIG. 1.

In this way, in the embodiment according to the present invention, as shown in FIG. 1, the plate conveyance device A provided with a plurality of conveyor plates 20 made to move along a conveyance route while spaced apart from each other is provided. In this plate conveyance device A, the conveyor plates 20 are successively loaded with sheet-shaped electrodes 1, and the conveyor plates 20 are respectively provided with clamps 21, 22, 23, 24 clamping the sheet-shaped electrodes 1 carried on the conveyor plates 20 onto the conveyor plates 20 to hold the sheet-shaped electrodes 1 at the placement positions on the conveyor plates 20 during conveyance. In this case, to hold the sheet-shaped electrodes 1 at the placement positions on the conveyor plates 20 during conveyance, the clamping force by the clamps 21, 22, 23, 24 has to satisfy the following condition:

Clamping force×friction coefficient>weight of sheet-shaped electrode 1×acceleration Here, the friction coefficient is the lower friction coefficient of the friction coefficient between the clamps 21, 22, 23, 24 and sheet-shaped electrode 1 without a positive electrode and the friction coefficient between the clamps 21, 22, 23, 24 and aluminum foil 2. Further, the acceleration is the maximum acceleration in the acceleration applied to the conveyor plate 20 in the plate conveyance device A. In the embodiment according to the present invention, the spring force of the tension spring 29 is set so that the clamping force by the clamps 21, 22, 23, 24 satisfies the above condition. By setting the clamping force in this way, the sheet-shaped electrodes 1 carried on the conveyor plates 20 can be held by the clamps 21, 22, 23, 24 at the placement positions on the conveyor plates 20 during conveyance without applying external force to the outer peripheral edges of the sheet-shaped electrodes 1. As a result, during conveyance, the outer peripheral edges of the sheet-shaped electrodes 1 can be kept from being damaged.

Figure 8:
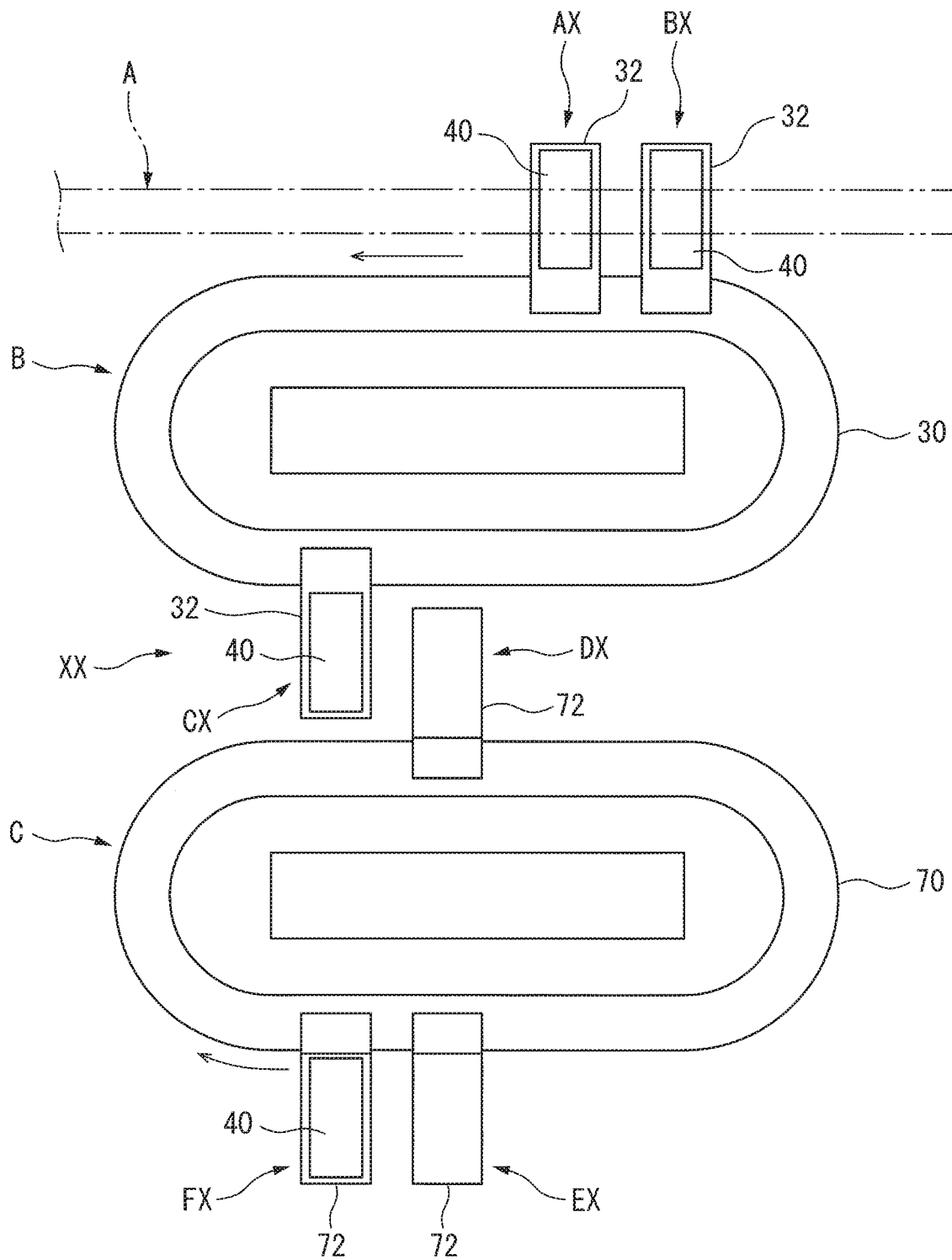
FIG. 8 is a plan view schematically showing the jig conveyance device and the jig transfer device.

Next, the action of stacking sheet-shaped electrodes 1 with positive electrodes will be explained. FIG. 8 is a plan view schematically illustrating the jig conveyance device B and the jig transfer device C shown in FIG. 1. This FIG. 8 shows the plate conveyance device A by broken lines. Referring to FIG. 1 and FIG. 8, the jig conveyance device B and the jig transfer device C are smaller versions of the plate conveyance device A and have similar functions to the plate conveyance device A. That is, the jig conveyance device B is provided with an elliptical shaped rail 30 comprised of a pair of straight parts arranged in parallel and a pair of semicircular parts and movers 31 of linear motors running on this rail 30. The movers 31 have similar structures to the movers 12 shown in FIG. 4. At the movers 31, the end parts of conveyor tables 32 extending from the elliptical shaped rail 30 to the outside in the horizontal direction are fastened. Stacking jigs 40 are placed on the conveyor tables 32.

Figure 10:
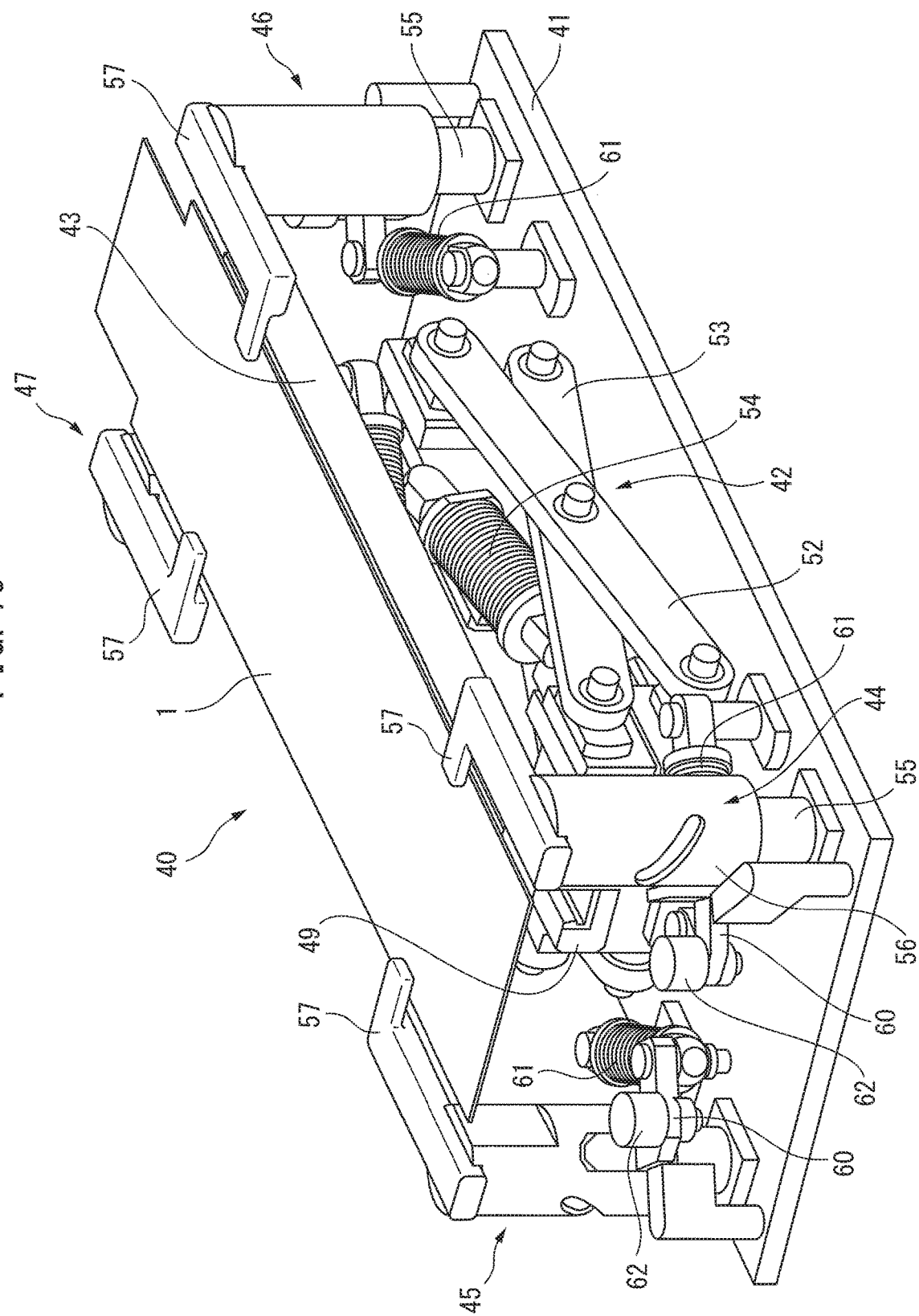
FIG. 10 is a perspective view of a stacking jig.
Figure 11A:
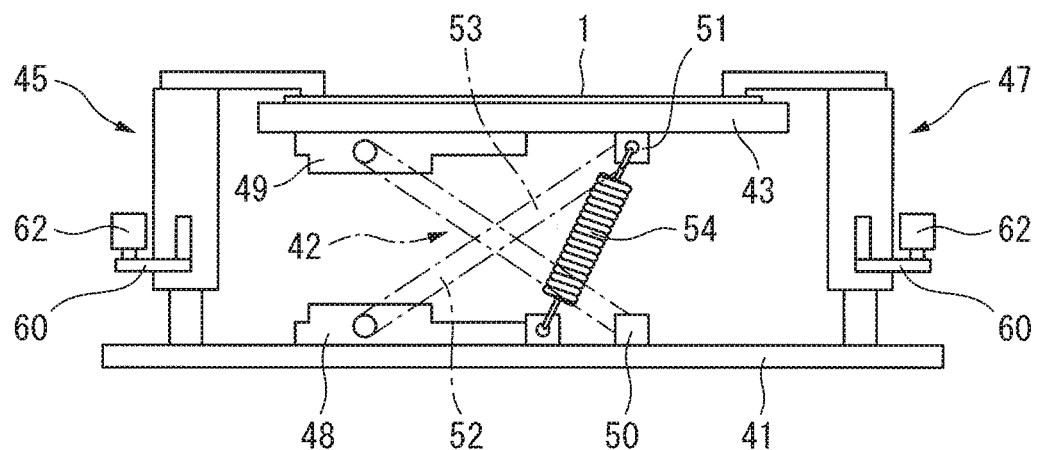
FIGS. 11A and 11B are views schematically showing a stacking jig.
Figure 11B:
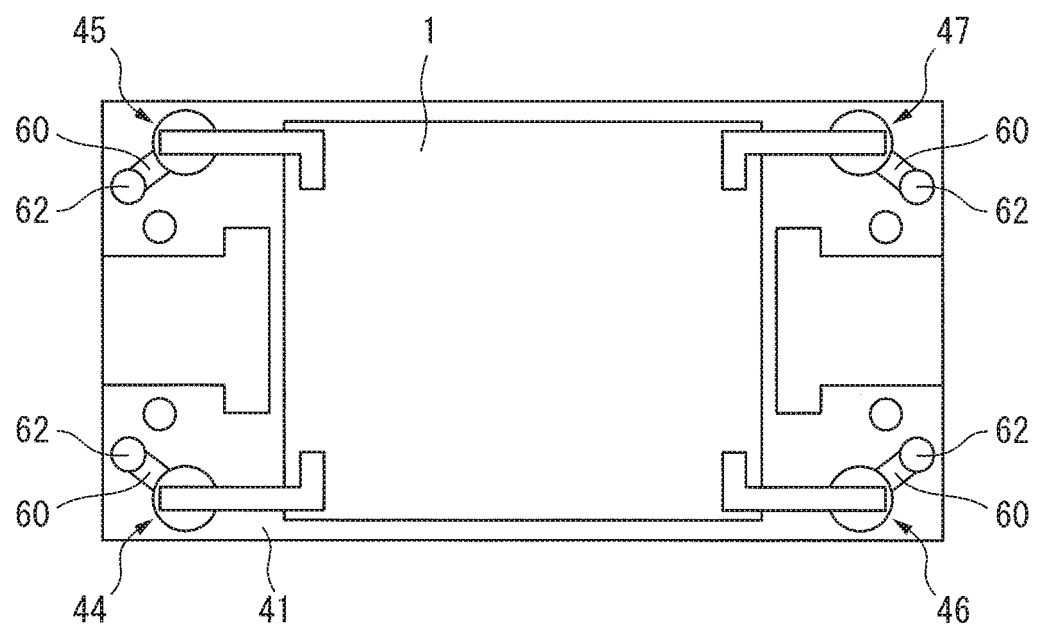

FIG. 10 shows a perspective view of the stacking jig 40. Further, FIG. 11A shows a side view of the stacking jig 40 shown schematically, while FIG. 11B is a plan view of the stacking jig 40 shown schematically. If referring to FIG. 10, FIG. 11A, and FIG. 11B, the stacking jig 40 is provided with a base 41, a bottom plate 43 supported by a pantograph type elevator mechanism 42 attached to the base 41, and four clamps 44, 45, 46, 47 arranged at the four corners of the base 41. The pantograph type elevator mechanism 42 is comprised of support parts 48 and 49 fastened to the top surface of the base 41 and the bottom surface of the bottom plate 43, sliders 50 and 51 sliding over the top surface of the base 41 and bottom surface of the bottom plate 43, and arms 52 and 53 connecting the support parts 48, 49 and sliders 50, 51. A compression spring 54 is attached between the support part 48 and the slider 51. Due to the spring force of this compression spring 54, the pantograph type elevator mechanism 42 is constantly biased in the rising direction. Due to this, the bottom plate 43 is constantly biased upward. That is, the bottom plate 43 is constantly biased upward by the spring biased pantograph type elevator mechanism 42. Note that, FIG. 10, to facilitate understanding of the structure, shows the time when separating the pantograph type elevator mechanism 42 from the bottom plate 43 and rendering the pantograph type elevator mechanism 42 the contracted state.

On the other hand, if comparing the clamps 44, 45, 46, 47 arranged at the four corners of the base 41, the clamps 44 and 47 have the same shapes while the clamps 45 and 46 have the same shapes. On the other hand, the clamps 44 and 45 have symmetric shapes with respect to the vertical plane, while the clamps 46 and 47 have symmetric shapes with respect to the vertical plane. That is, the clamps 44, 45, 46, 47 all have similar structures. Therefore, the clamp 44 will be used as an example to explain the structures of the clamps.

Figure 12A:
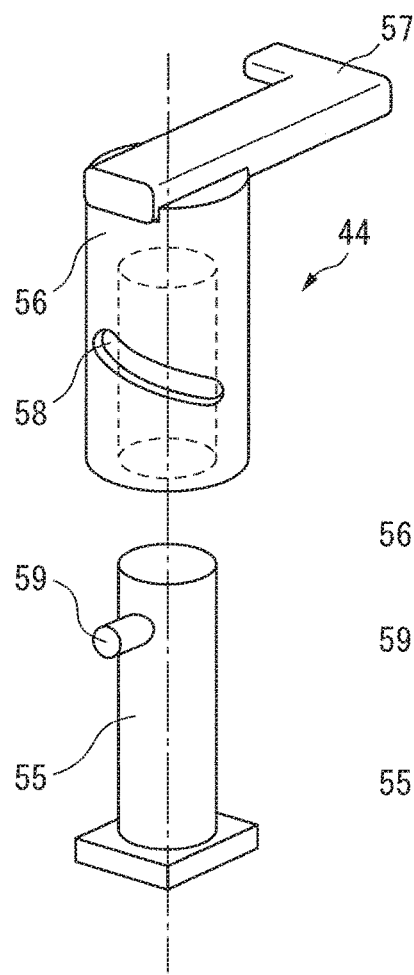
FIGS. 12A, 12B, and 12C are views for explaining the operation of a clamp of a stacking jig.
Figure 12B:
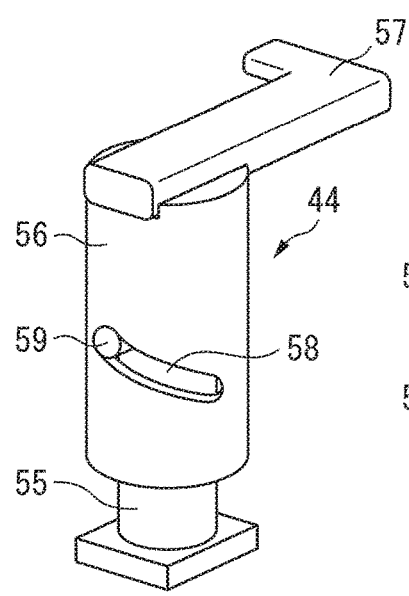
Figure 12C:
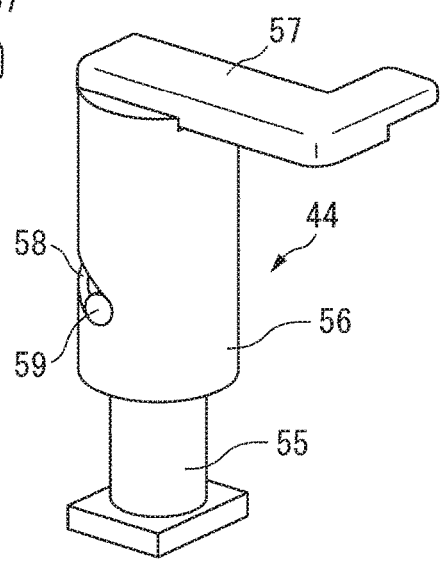

FIG. 12A is a disassembled perspective view of the clamp 44, while FIG. 12B and FIG. 12C are views for explaining the operation of the clamp 44. If referring to FIG. 10 and FIG. 12A, the clamp 44 is provided with a support column 55 fastened to the base 41, a rotating part 56 inserted over the support column 55 to be able to rotate, and an L-shaped clamp arm 57 attached to the top part of the rotating part 56. On the other hand, the rotating part 56 is formed with a slit 58 extending in a spiral manner, while the outer circumferential surface of the support column 55 is formed with a projection 59 entering into the slit 58. As shown in FIG. 10, at the outer circumferential surface of the rotating part 56, one end part of the drive arm 60 forming an L-shape is fastened. Between the other end part of the drive arm 60 and the base 41, a compression spring 61 is attached. Further, at the center part of the drive arm 60, the roller 62 is attached.

FIG. 11A and FIG. 11B schematically show the drive arms 60 and rollers 62 attached to the rotating parts 56 of the clamps 44, 45, 46, 47. Note that, in FIG. 12A, FIG. 12B, and FIG. 12C, these drive arms 60 and rollers 62 are omitted.

The roller 62 attached to the drive arm 60 engages with a stationary cam (not shown) when the stacking jig 40 is made to move. If the roller 62 engages with the stationary cam, the roller 62 is pushed by the stationary cam toward the inside of the stacking jig 40. As a result, the rotating part 56 is made to rotate against the spring force of the compression spring 61. At this time, the rotating part 56 of the clamp 44 is made to rotate clockwise. FIG. 12B shows the state before the rotating part 56 of the clamp 44 is made to rotate. At this time, the clamp arms 57 of the clamps 44, 45, 46, 47 are held at the positions shown in FIG. 10 by the spring force of the compression spring 60. The sheet-shaped electrode 1 carried on the bottom plate 43 at this time is pushed against the bottom surface of the clamp arm 57 by the spring biased pantograph type elevator mechanism 42, that is, by the spring force of the compression spring 54. If looking at this from another angle, it can be said that at this time, the clamp arms 57 of the clamps 44, 45, 46, 47 are clamping the sheet-shaped electrode 1 carried on the bottom plate 43 against the bottom plate 43. Therefore, in the Description of the present application, while the substantive meaning is the same, sometimes the sheet-shaped electrode 1 is pushed against the bottom surface of the clamp arm 57 and sometimes the clamp arm 57 clamps the sheet-shaped electrode 1 placed on the bottom plate 43 against the bottom plate 43.

On the other hand, FIG. 12C shows the state after the rotating part 56 of the clamp 44 is made to rotate. As shown in FIG. 12B and FIG. 12C, the projection 59 enters into the slit 58 extending in a spiral manner, so if the rotating part 56 is made to rotate, the rotating part 56 is pushed up by the projection 59 and therefore the rotating part 56 rises while rotating. At this time, the clamp arm 57, in FIG. 10, separates from the sheet-shaped electrode 1 upward while leaving the region above the sheet-shaped electrode 1. Due to this, the clamping action of the clamp arm 57 on the sheet-shaped electrode 1 is ended.

Figure 13:
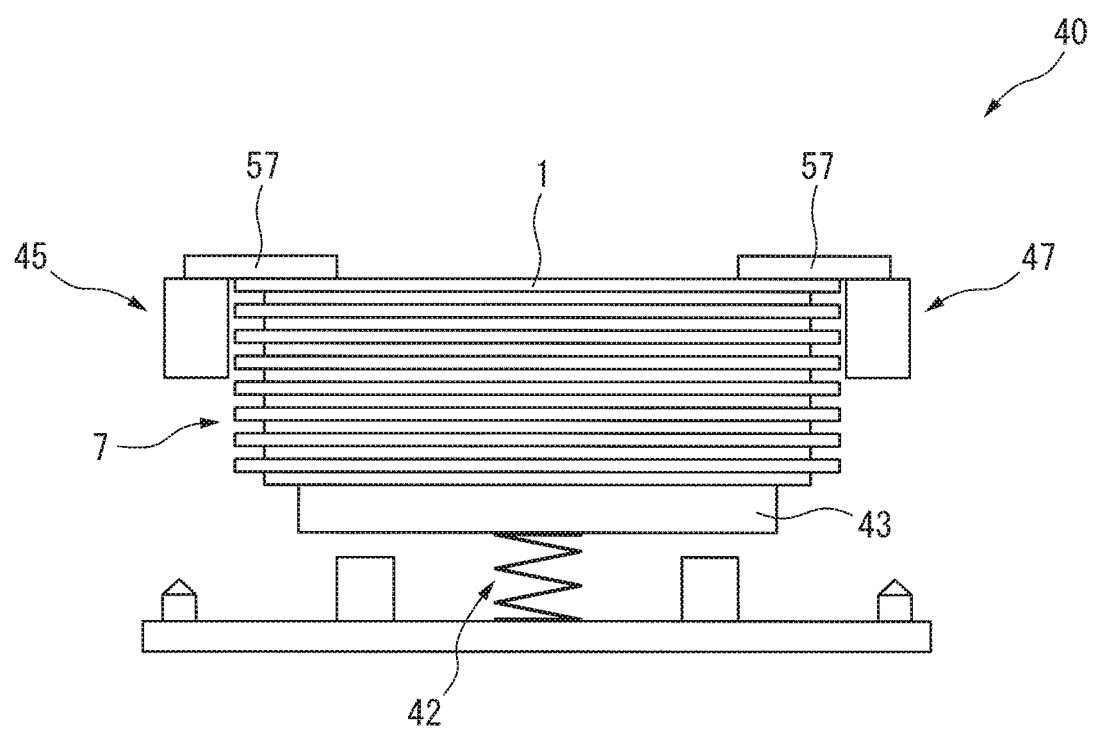
FIG. 13 is a side view of a schematically illustrated stacking jig.

FIG. 13 schematically shows a state where a preset number of sheet-shaped electrodes 1 with positive electrodes are stacked on the bottom plate 43 of the stacking jig 40. Note that, in the following explanation, for simplification, the pantograph type elevator mechanism 42 is shown by the symbol showing the spring such as shown in FIG. 13. Now, as explained while referring to FIG. 7, in the embodiment according to the present invention, the sheet-shaped electrode 1 with a positive electrode is stacked in the state with the conveyor plate 20 turned upside down. At this time, as shown in FIG. 7, the stacking jig 40 is conveyed so that the top surface of the stacking jig 40 faces the sheet-shaped electrode 1 carried on the conveyor plate 20. In this case, in the embodiment according to the present invention, the conveyor plate 20 is made to move in the direction of advance while the stacking action is performed, so the stacking jig 40 is conveyed so that the top surface of the stacking jig 40 continues to face the sheet-shaped electrode 1 carried on the conveyor plate 20 while the stacking action is being performed.

In this regard, as already explained while referring to FIG. 1 and FIG. 8, in the embodiment according to the present invention, the end part of the conveyor table 32 is fastened to the mover 31 of the jig conveyance device B, while the stacking jig 40 is carried on the conveyor table 32. Therefore, in the embodiment according to the present invention, the jig conveyance device B is arranged so that while the stacking action is being performed, the top surface of the stacking jig 40 can continue to face the sheet-shaped electrode 1 carried on the conveyor plate 20, that is, so that while the stacking action is being performed, the stacking jig 40 carried on the conveyor table 32 can continue moving directly under the plate conveyance device A. Furthermore, in the embodiment according to the present invention, while the stacking action is being performed, the conveyor plate 20 and the conveyor table 32 are made to synchronously move so that the top surface of the stacking jig 40 continues to face the sheet-shaped electrode 1 carried on the conveyor plate 20.

Figure 14:
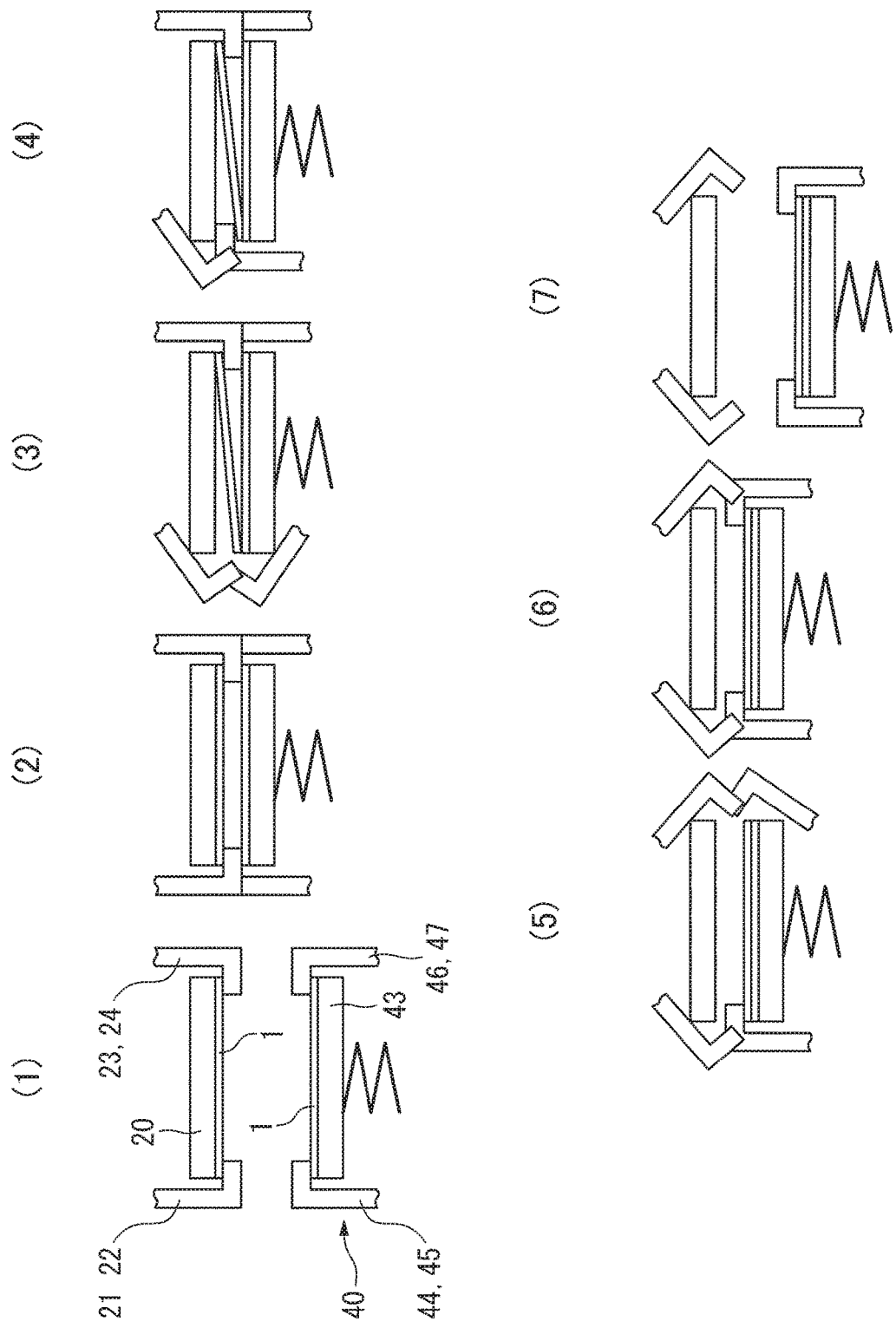
FIG. 14 is a view for explaining stacking work of sheet-shaped electrodes.

Next, the stacking work performed while continuing to make the top surface of the stacking jig 40 face the sheet-shaped electrode 1 carried on a conveyor plate 20 will be explained while referring to FIG. 14. Note that, FIG. 14 schematically shows the clamping action of the sheet-shaped electrode 1 by the clamps 21, 22, 23, 24 of the conveyor plate 20 and the clamping action of the sheet-shaped electrode 1 by the clamps 44, 45, 46, 47 of the stacking jig 40. Note that, in the explanation of FIG. 14, by (1) of FIG. 14, the sheet-shaped electrode 1 carried on the conveyor plate 20 will be called a "new sheet-shaped electrode 1" and the sheet-shaped electrode 1 already present on the bottom plate 43 of the stacking jig 40 will be called a "stacked sheet-shaped electrode 1".

Referring to FIG. 14, from the state shown by (1) of FIG. 14, as shown by (2) of FIG. 14, if the top surface of the stacking jig 40 faces and approaches the new sheet-shaped electrode 1 carried on the conveyor plate 20, as shown by (3) of FIG. 14, in the state with the peripheral part at one side of the stacked sheet-shaped electrode 1 clamped by the clamps 46, 47 of the stacking jig 40, the clamping action of the peripheral part at the other side of the stacked sheet-shaped electrode 1 by the clamps 44, 45 of the stacking jig 40 is released, and in the state with the peripheral part at one side of the new sheet-shaped electrode 1 clamped by the clamps 23, 24 of the conveyor plate 20, the clamping action of the peripheral part at the other side of the new sheet-shaped electrode 1 by the clamps 21, 22 of the conveyor plate 20 is released. At this time, as shown by (3) of FIG. 14, the peripheral part at the other side of the new sheet-shaped electrode 1 drops down on the stacked sheet-shaped electrode 1.

If the peripheral part at the other side of the new sheet-shaped electrode 1 drops down on the stacked sheet-shaped electrode 1, as shown by (4) of FIG. 14, the peripheral part at the other side of the new sheet-shaped electrode 1 dropped down on the stacked sheet-shaped electrode 1 is clamped by the clamps 44, 45 of the stacking jig 40. Next, as shown by (5) of FIG. 14, in the state with the peripheral part at the other side of the new sheet-shaped electrode 1 dropped down on the stacked sheet-shaped electrode 1 clamped by the clamps 44, 45 of the stacking jig 40, the clamping action on the peripheral part at one side of the stacked sheet-shaped electrode 1 by the clamps 44, 45 of the stacking jig 40 is released and the clamping action on the peripheral part at one side of the new sheet-shaped electrode 1 by the clamps 23, 24 of the conveyor plate 20 is released. Due to this, the peripheral part at one side of the new sheet-shaped electrode 1 also drops onto the stacked sheet-shaped electrode 1. If the peripheral part at one side of the new sheet-shaped electrode 1 also drops onto the stacked sheet-shaped electrode 1, as shown by (6) of FIG. 14, the peripheral part at one side of the new sheet-shaped electrode 1 dropped down on the stacked sheet-shaped electrode 1 is clamped by the clamps 46, 47 of the stacking jig 40.

Next, as shown by (7) of FIG. 14, the stacked sheet-shaped electrode 1 and the new sheet-shaped electrode 1 which are stacked on the bottom plate 43 of the stacking jig 40 separate from the conveyor plate 20 in the state clamped by the clamps 44, 45, 46, 47 of the stacking jig 40. That is, the stacked sheet-shaped electrode 1 and the new sheet-shaped electrode 1 which are stacked on the bottom plate 43 separate from the conveyor plate 20 in the state clamped against the bottom surface of the clamp arm 57 by the spring biased pantograph type elevator mechanism 42, that is, the spring force of the compression spring 54. With this, the action of stacking one sheet-shaped electrode 1 on the stacking jig 40 is completed. Note that, by (1) to (7) of FIG. 14, the clamping action and unclamping action by the clamps 21, 22, 23, 24 of the conveyor plate 20 are performed by the roller 28 engaging with the stationary cam during movement of the conveyor plate 20, while the clamping action and unclamping action by the clamps 44, 45, 46, 47 of the stacking jig 40 are performed by the roller 62 of the stacking jig 40 engaging with the stationary cam during movement of the conveyor table 32.

In this way, in the embodiment according to the present invention, the stacking jigs 40 for stacking sheet-shaped electrodes 1 carried on conveyor plates 20 and the jig conveyance device B for conveying the stacking jigs 40 are provided, and the stacking jigs 40 are provided with the bottom plates 43 for supporting the sheet-shaped electrodes 1 and at least single pairs of clamps 44, 45, 46, 47 for clamping the sheet-shaped electrodes 1 carried on the bottom plates 43 against the bottom plates 43 and holding the sheet-shaped electrodes 1 at the placement positions of the conveyor plates 20. Further, the clamps of the conveyor plates 20 are comprised of at least single pairs of clamps 21, 22, 23, 24. When stacking the sheet-shaped electrodes 1 carried on the conveyor plates 20 inside the stacking jigs 40, the sheet-shaped electrodes 1 are clamped against the conveyor plates 1 by the clamps 21, 22, 23, 24 of the conveyor plates 20 while the conveyor plates 1 are turned upside down and the conveyor plates 20 and stacking jigs 40 are made to synchronously move so that the top surfaces of the stacking jigs 40 continue to face the sheet-shaped electrodes 1 carried on the conveyor plates 1.

When the conveyor plates 20 and the stacking jigs 40 are made to synchronously move, the sheet-shaped electrodes 1 carried on the conveyor plates 20 are stacked inside the stacking jigs 40 while the peripheral parts of the sheet-shaped electrodes 1 are clamped by the clamps of either the clamps 21, 22, 23, 24 of the conveyor plates 20 and the clamps 44, 45, 46, 47 of the stacking jigs 40. In this case, in the embodiment according to the present invention, during the time in which the conveyor plates 20 and the stacking jigs 40 are made to synchronously move, when, in a state that the peripheral parts of one sides of the sheet-shaped electrodes 1 are clamped by some of the clamps 23, 24 of the conveyor plates 20, the other clamps 21, 22 of the conveyor plates 20 release the peripheral parts of the other sides of the sheet-shaped electrodes 1, the peripheral parts of the other sides of the sheet-shaped electrodes 1 are clamped by some of the clamps 44, 45 of the stacking jigs 40, then ,in a state that the peripheral edges of the other sides of the sheet-shaped electrodes 1 are clamped by some of the clamps 44, 45 of the stacking jigs 40, some of the clamps 23, 23 of the conveyor plates 20 release the peripheral parts of one sides of the sheet-shaped electrodes 1. In this way, in the embodiment according to the present invention, the new sheet-shaped electrodes 1 carried on the conveyor plate 20 are stacked on the stacked sheet-shaped electrodes 1 in the stacking jigs 40 in a state that the new sheet-shaped electrodes 1 carried on the conveyor plate 20 are clamped by at least one of the clamps of the clamps 21, 22, 23, 24 of the conveyor plates 20 and clamps 44, 45, 46, 47 of the stacking jigs 40. Therefore, the new sheet-shaped electrodes 1 are stacked precisely on the stacked sheet-shaped electrodes 1 without deviating in position with respect to the stacked sheet-shaped electrodes 1.

On the other hand, as shown by (7) in FIG. 14, to hold a stack of sheet-shaped electrodes 1 carried on the bottom plate 43 of the stacking jig 40 at the placement position on the bottom plate 43, the clamping force by the clamps 44, 45, 46, 47 of the stacking jig 40 has to satisfy the following condition:

Clamping force×friction coefficient>weight of stack
of sheet-shaped electrodes 1×acceleration Here, the "friction coefficient" is the friction coefficient between a clamp and sheet-shaped electrode 1, while the "acceleration" is the maximum acceleration in the acceleration applied to the stacking jig 40 after sheet-shaped electrode 1 has been stacked in the stacking jig 40. In the embodiment according to the present invention, the spring force of the tension spring 54 of the pantograph type elevator mechanism 42 is set so that the clamping force by the clamps 44, 45, 46, 47 satisfies the above condition. By setting the clamping force in this way, it is possible to hold the stack of the sheet-shaped electrodes 1 carried on the bottom plate 43 of the stacking jig 40 at the placement position on the bottom plate 43 during conveyance without external force being applied to the outer peripheral edges of the stacked sheet-shaped electrodes 1 by the clamps 44, 45, 46, 47. As a result, it is possible to prevent the outer peripheral edges of the sheet-shaped electrodes 1 from being damaged.

As shown in FIG. 8, in the embodiment according to the present invention, the jig conveyance device B has three conveyor tables 32 supported by movers 31, and the stacking jigs 40 are carried on the conveyor tables 32. These conveyor tables 32 are made to move by the movers 31 in the arrow direction. In FIG. 8, for example, when the work of stacking the sheet-shaped electrode 1 carried on a certain conveyor plate 20 on the stacking jig 40 is being performed for the stacking jig 40 on the conveyor table 32 shown by AX, the work of stacking a sheet-shaped electrode 1 on the stacking jig 40 from a conveyor plate 20 following this certain conveyor plate 20 is performed for the stacking jig 40 on the conveyor table 32 shown by BX. On the other hand, the stacking jig 40 on the conveyor table 32 shown by CX shows the stacking jig 40 at which the work of the stacking sheet-shaped electrode 1 on the stacking jig 40 has already finished, and when the work of stacking the sheet-shaped electrode 1 on the stacking jig 40 is completed, the conveyor table 32 is made to move behind the preceding conveyor table 32, that is, the conveyor table 32 shown by BX in FIG. 8, at a high speed. Note that, the jig conveyance device B may have four or more conveyor tables 32 placed on it.

The sheet-shaped electrodes 1 conveyed one after the other by the conveyor plates 20 are stacked one after the other one by one inside the successively conveyed stacking jigs 40 on the conveyor tables 32. The work of stacking the sheet-shaped electrode 1 on the stacking jig 40 is performed at a high speed. Therefore, a stack of a preset number of sheet-shaped electrodes 1 is formed in each stacking jig 40 in a short time. This stack of a preset number of sheet-shaped electrodes 1 is shown by the reference numeral 7 in FIG. 13. When the stack 7 of the preset number of sheet-shaped electrodes 1 is formed, the stacking jig 40 is removed from conveyor table 32 of the jig conveyance device B while holding the stack 7 of the sheet-shaped electrodes 1 for the next processing and an empty stacking jig 40 is sent to the conveyor table 32. That is, the work of changing the stacking jig 40 comprising removing the stacking jig 40 holding the stack 7 of the sheet-shaped electrodes 1 and sending an empty stacking jig 40 is performed. This work of changing stacking jigs 40 is performed by the jig transfer device C.

As explained above, this jig transfer device C is a smaller sized version of the plate conveyance device A and has a similar function to the plate conveyance device A. That is, the jig transfer device C, as shown in FIG. 1 and FIG. 8, is provided with an elliptical shaped rail 70 comprised of a parallel arranged pair of straight parts and a pair of semi-circular parts and movers 71 of linear motors running on this rail 70. The jig transfer device C has three conveyor tables 72 supported by the movers 71. These conveyor tables 72 are made to move by the movers 71 in the arrow direction. On these movers 71, the end parts of the conveyor tables 72 are fastened. The conveyor tables 72 extend outward in the horizontal direction from the elliptical shaped rail 70. The jig transfer device C is set at a position at a somewhat lower position from the jig conveyance device B. Furthermore, the jig transfer device C is arranged adjoining the jig conveyance device B so that the conveyor tables 32 of the jig conveyance device B and the conveyor tables 72 of the jig transfer device C are superposed spaced apart from each other in the vertical direction. Note that, four or more conveyor tables 72 may also be set at this jig transfer device C.

Figure 9A:
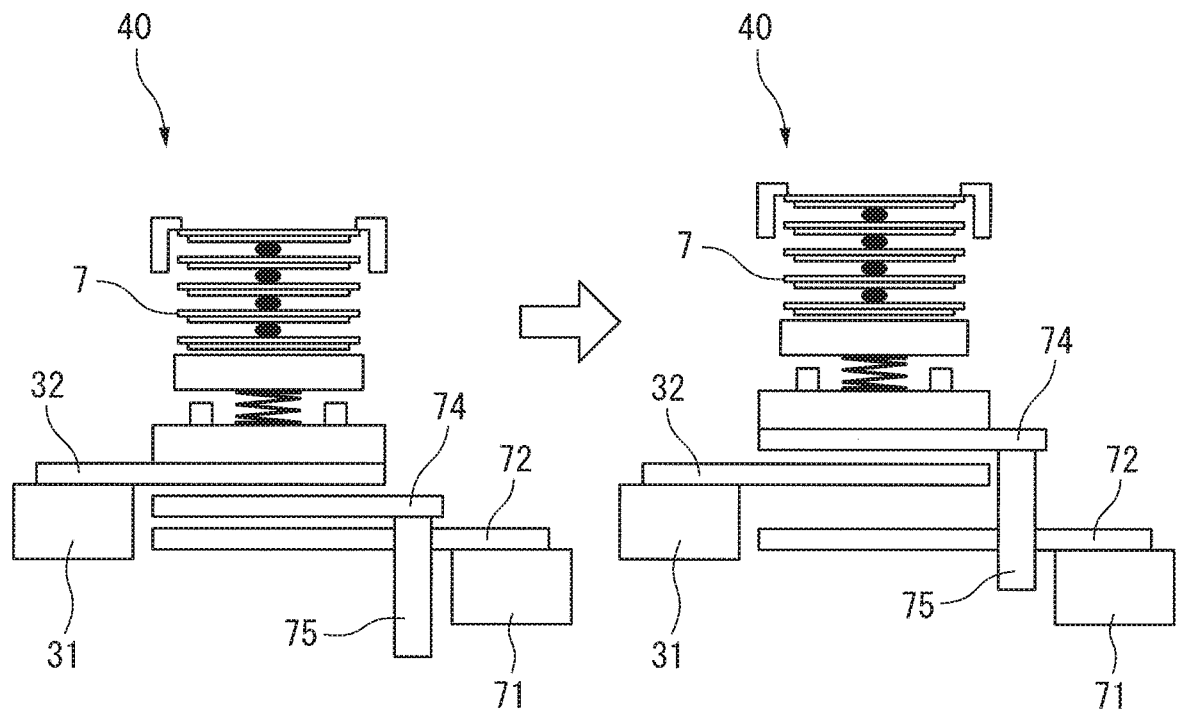
FIGS. 9A and 9B are views for explaining the work of changing stacking jigs between the jig conveyance device and the jig transfer device.
Figure 9B:
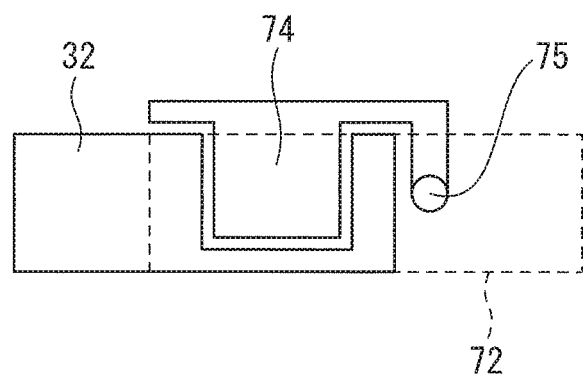

FIG. 9A shows a side view schematically illustrating the conveyor table 32 of the conveyance device B and the conveyor table 72 of the jig transfer device C seen from XX of FIG. 8, while FIG. 9B shows a plan view schematically illustrating the conveyor table 32 of the conveyance device B and the conveyor table 72 of the jig transfer device C. If referring to FIG. 9A and FIG. 9B, the mover 31 and the conveyor table 32 of the jig conveyance device B and the mover 71 and the conveyor table 72 of the jig transfer device C are shown in FIG. 9A. Further, the stacking jig 40 holding the stack 7 are shown in FIG. 9A. On the other hand, in FIG. 9B, the conveyor table 32 of the conveyance device B is shown by a solid line and the conveyor table 72 of the jig transfer device C is shown by a broken line. Further, as schematically shown in FIG. 9A and FIG. 9B, an elevator rod 75 provided with an elevator table 74 is attached to the conveyor table 72 of the jig transfer device C so as to be able to slide in the vertical direction. This elevator rod 75 performs an ascending action and descending action when engaging with a stationary cam (not shown).

The work of changing the stacking jig 40 is, for example, performed as follows: In FIG. 8, DX shows the conveyor table 72 in the empty state where the elevator table 74 is positioned at the lowest most position shown in FIG. 9A and the elevator table 74 is not carrying the stacking jig 40. This conveyor table 72 stands by at the illustrated position. Now, in FIG. 8, assuming that the conveyor table 32 shown by CX is a conveyor table holding the stacking jig 40 finished in the action of stacking a preset number of sheet-shaped electrodes 1, the figure at the left side of FIG. 9A shows when this conveyor table 32 is superposed right above the standing by conveyor table 72. If the conveyor table 32 is superposed right above the conveyor table 72, the conveyor table 32 and the conveyor table 72 advance together in the superposed state. If the conveyor table 32 and the conveyor table 72 advance together in the superposed state, the elevator rod 75 is pushed up by the stationary cam due to which the elevator table 74 rises while passing through the conveyor table 32. At this time, as shown by the view of the right side of FIG. 9A, the stacking jig 40 moves to the elevator table 74. If the stacking jig 40 moves to the elevator table 74, the conveyor table 72 rapidly separates from the conveyor table 32 in the state carrying the stacking jig 40 and, for example, is made to move behind the conveyor table 72 shown by EX.

Next, the stacking jig 40 holding the stack 7 of the sheet-shaped electrodes 1 is for example manually removed from this moving conveyor table 72 for the next processing.

On the other hand, if the conveyor table 72 rapidly separates from the conveyor table 32, the conveyor table 72 carrying the empty stacking jig 40 shown by FX is immediately made to move to this conveyor table 32. At this time, if the conveyor table 72 approaches the conveyor table 32, due to the stationary cam, the elevator rod 75 of the conveyor table 72 is pushed up. Due to this, the elevator table 74 carrying the empty stacking jig 40 rises and, as shown in FIG. 9A, the conveyor table 72 is superposed over the conveyor table 32. However, at this time, the stacking jig 40 carried on the elevator table 74, unlike the case shown in FIG. 9A, is the empty stacking jig 40. If the conveyor table 72 is superposed right over the conveyor table 32, the conveyor table 32 and conveyor table 72 advance together in the superposed state. If advancing together in the state with the conveyor table 32 and conveyor table 72 superposed, due to the stationary cam, the elevator rod 75 descends and thereby the elevator table 74 descends. At this time, as shown by the figure at the left side of FIG. 9A, the stacking jig 40 rides to over the conveyor table 32. However, at this time, the stacking jig 40 carried on the conveyor table 32, unlike the case shown in FIG. 9A, is the empty stacking jig 40.

By doing this, the stacking jig 40 carried on the conveyor table 32 in the state holding the stack 6 of the sheet-shaped electrodes 1 is changed with an empty stacking jig 40. The conveyor table 32 carrying the empty stacking jig 40 is made to move behind the preceding conveyor table 32 shown by BX by a high speed. On the other hand, the conveyor table 72 finished transferring the empty stacking jig 40 is made to move behind the preceding conveyor table 72. If explaining the conveyor table 72 standing by at the position shown by FX, EX, the conveyor table 7 standing by for receiving the stacking jig 40 holding the stack 7 of the sheet-shaped electrode 1 from the conveyor table 32 is rendered a state wherein it does not carry anything while an empty stacking jig 40 is placed on the conveyor table 72 standing by for transferring an empty stacking jig 40 to the conveyor table 32, for example, by manual.

At the jig conveyance device B, the work of stacking the sheet-shaped electrode 1 on the stacking jig 40 carried on the conveyor table 32 is performed at short time intervals. Therefore, when a preset number of sheet-shaped electrodes 1 are stacked on the stacking jig 40, it is difficult to remove the stacking jig 40 and place an empty stacking jig 40 on the conveyor table 32, for example, by manual. As opposed to this, if the jig transfer device C is provided, it becomes possible to remove the stacking jig 40 holding the stack 7 of the sheet-shaped electrodes 1 from the conveyor table 72 and attach an empty stacking jig 40 to the conveyor table 72 at long time intervals. Therefore, it is possible to change the stacking jig 40 with leeway.

Figure 15:
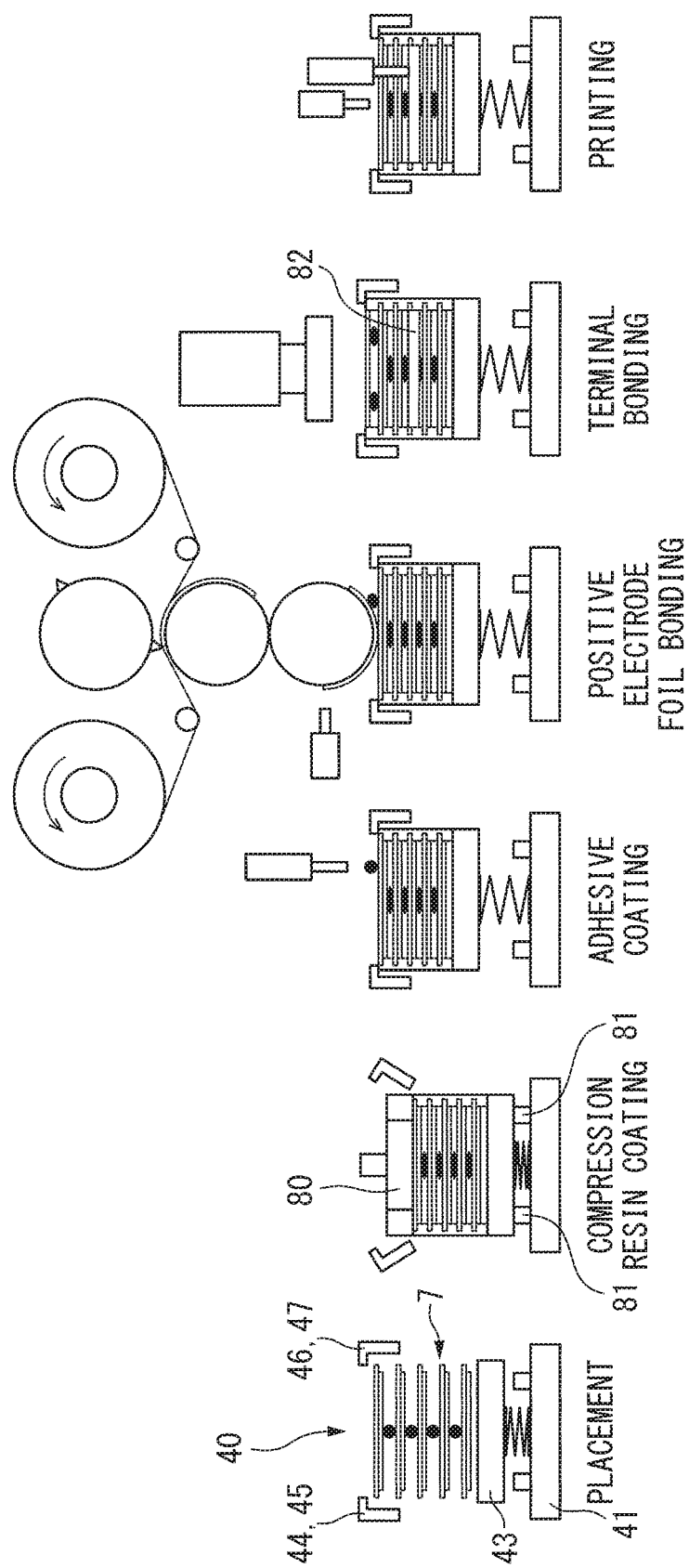
FIG. 15 is a view showing a process for forming an electrode stack.

Next, the process of forming an electrode stack performed using the stacking jig 40 holding the stack 7 of sheet-shaped electrodes 1 will be explained. FIG. 15 schematically shows the process of formation of this electrode stack, and in this FIG. 15, the base plate 41, bottom plate 43, and clamps 44, 45, 46, 47 of the stacking jig 40 and the stack 7 of the sheet-shaped electrodes 1 are schematically shown. Referring to FIG. 15, first, the stacking jig 40 holding the stack 7 of the sheet-shaped electrodes 1 is placed on the conveyor of the conveyance device or on a work table. Next, the clamping action by the clamps 44, 45, 46, 47 is released and the stack 7 of the sheet-shaped electrodes 1 is compressed by the press device 80. At this time, the bottom plate 43 abuts against a stopper 81 provided on the base plate 41. Next, in the state with the stack 7 of the sheet-shaped electrodes 1 compressed, the side surfaces of the stack 7 of the sheet-shaped electrodes 1 are coated with a resin. Due to this, the side surfaces of the sheet-shaped electrodes 1 are firmly fastened to each other by the resin.

Next, an adhesive coating processing for coating an adhesive on the sheet-shaped electrodes 1 is performed. Next, a positive electrode foil bonding processing for bonding aluminum (positive electrode) foil 2 on the sheet-shaped electrodes 1 using an adhesive is performed. Next, a terminal joining processing for joining a power takeout terminal 82 to a connection use electrode tab of the sheet-shaped electrodes 1 is performed. Due to this, an electrode stack of sheet-shaped electrodes 1 is produced. Next, finally, the produced electrode stack of the sheet-shaped electrodes 1 is printed with a lot number etc. The thus formed electrode stack is, for example, covered by a laminate film in a bag form. The plurality of electrode stacks covered by laminate films in bag shapes are electrically connected in series or in parallel whereby, for example, a battery to be carried in a vehicle is formed.

Note that, as explained above, if the sheet-shaped electrode 1 is placed on the conveyor plate 20, this sheet-shaped electrode 1 is clamped against the conveyor plate 20 by the clamps 21, 22, 23, 24. While the sheet-shaped electrode 1 is stacked from the conveyor plate 20 to the stacking jig 40, the sheet-shaped electrode 1 is clamped by the clamps of either of the clamps 21, 22, 23, 24 of the conveyor plate 20 and the clamps 44, 45, 46, 47 of the stacking jig 40. In addition, even when the sheet-shaped electrode 1 is stacked in the stacking jig 40, the sheet-shaped electrode 1 is clamped by the clamps 44, 45, 46, 47 of the stacking jig 40. In this way, in the embodiment according to the present invention, the sheet-shaped electrode 1 continues to be clamped by at least one of the clamps 21, 22, 23, 24 of the conveyor plate 20 and the clamps 44, 45, 46, 47 of the stacking jig 40 from when the sheet-shaped electrode 1 is placed on the conveyor plate 20 to when the stack 7 of the sheet-shaped electrodes 1 is compressed by the compression device 80.

The invention claimed is:

1. An electrode stack manufacturing apparatus for manufacturing an electrode stack containing a sheet-shaped electrode, comprising:
    a plate conveyance device provided with a plurality of conveyor plates which are made to move along a conveyance route spaced apart from each other, sheet-shaped electrodes being successively placed on the conveyor plates, each conveyor plate being provided with clamps for clamping the sheet-shaped electrode carried on the conveyor plate against the conveyor plate to thereby hold the sheet-shaped electrode at a placement position on the conveyor plate during conveyance.

2. The electrode stack manufacturing apparatus according to claim 1, wherein the sheet-shaped electrode includes a metal foil for current collection use and at least one of a positive electrode active material layer and negative electrode active material layer formed on the metal foil for current collection use.

3. The electrode stack manufacturing apparatus according to claim 1, further comprising stacking jigs for stacking the sheet-shaped electrodes carried on conveyor plates and a jig conveyance device for conveying said stacking jig, said stacking jig comprising a bottom plate for supporting the sheet-shaped electrode and at least a pair of clamps for clamping the sheet-shaped electrode carried on the bottom plate against the bottom plate to hold the sheet-shaped electrode at a placement position on the bottom plate, wherein
    the clamps of the conveyor plate are comprised of at least a pair of clamps,
    when the sheet-shaped electrode carried on the conveyor plate is stacked in the stacking jig, the sheet-shaped electrode is clamped to the conveyor plate by the clamps of the conveyor plate while the conveyor plate is turned upside down, and the conveyor plate and the stacking jig are made to move synchronized so that the top surface of the stacking jig is made to continue to face the sheet-shaped electrode carried on the conveyor plate, and
    when the conveyor plate and the stacking jig are made to move synchronized, the sheet-shaped electrode carried on the conveyor plate is stacked in the stacking jig while the peripheral side of the sheet-shaped electrode is pressed by one of the clamps of the clamp of the conveyor plate and clamp of the stacking jig.

4. The electrode stack manufacturing apparatus according to claim 3, wherein when the conveyor plate and the stacking jig are made to move synchronized, in the state where one clamp of the conveyor plate is clamping a peripheral part at one side of the sheet-shaped electrode, when another clamp of conveyor plate releases the peripheral part at the other side of the sheet-shaped electrode, the peripheral part at the other side of the sheet-shaped electrode is clamped by another clamp of the stacking jig, then in the state where the other clamp of the stacking jig is clamping the peripheral part at the other side of the sheet-shaped electrode, the one clamp of the conveyor plate releases the peripheral part at the one side of the sheet-shaped electrode.

5. The electrode stack manufacturing apparatus according to claim 3, wherein the bottom plate of the stacking jig is constantly biased upward by a spring force.

6. The electrode stack manufacturing apparatus according to claim 5, wherein the bottom plate of the stacking jig is constantly biased upward by a spring biased pantograph type elevator mechanism.

7. The electrode stack manufacturing apparatus according to claim 1, wherein a stack of sheet-shaped electrodes held by a stacking jig is compressed by a compression device, then, in the compressed state, the side surface parts of the stack of the sheet-shaped electrodes are coated with a resin, whereby the side surface parts of the sheet-shaped electrodes are firmly fastened together, and the sheet-shaped electrodes continue to be clamped by at least one of the clamps of the conveyor plate and clamps of the stacking jig from when the sheet-shaped electrodes are carried on the conveyor plate to when the stack of sheet-shaped electrodes is compressed by the compression device.

8. The electrode stack manufacturing apparatus according to claim 1, further comprising stacking jigs for stacking the sheet-shaped electrodes carried on conveyor plates, a jig conveyance device for conveying the stacking jig, and a jig transfer device for receiving the stacking jig holding a stack of a preset number of sheet-shaped electrodes from the jig conveyance device and sending an empty stacking jig to the jig conveyance device.

9. The electrode stack manufacturing apparatus according to claim 1, wherein said clamps are attached to the two end parts of the conveyor plate and the clamps are clamped on the sheet-shaped electrode by the spring force.

10. The electrode stack manufacturing apparatus according to claim 1, wherein said plate conveyance device comprises an elliptical shaped rail comprised of horizontal straight parts spaced apart from each other in a vertical direction in a vertical plane and a pair of semicircular parts and movers of linear motors running on the rails, and said apparatus further comprises stacking jigs for stacking sheet-shaped electrodes carried on the conveyor plates and a jig conveyance device for conveying the stacking jigs, the conveyor plates being attached to said movers, the sheet-shaped electrodes being placed on the conveyor plates at an upper horizontal straight part, the sheet-shaped electrodes held on the conveyor plate being stacked in the stacking jig after said movers descend at the semicircular part and the conveyor plates are turned upside down.

* * * * *